US006094988A

United States Patent [19]

Aindow

[11] Patent Number: 6,094,988

[45] Date of Patent: Aug. 1, 2000

[54] ELECTRICAL COUPLING FOR PIEZOELECTRIC ULTRASOUND DETECTOR

[75] Inventor: Joseph Aindow, Dorchester, United Kingdom

[73] Assignee: Precision Acoustics Limited, United Kingdom

[21] Appl. No.: 08/875,982

[22] PCT Filed: Feb. 16, 1996

[86] PCT No.: PCT/GB96/00368

§ 371 Date: Nov. 3, 1997

§ 102(e) Date: Nov. 3, 1997

[87] PCT Pub. No.: WO96/25244

PCT Pub. Date: Aug. 22, 1996

[30] Foreign Application Priority Data

Feb. 16, 1995 [GB] United Kingdom .................... 9502999

[51] Int. Cl.$^7$ .................................................. G01H 11/00

[52] U.S. Cl. ......................... 73/649; 310/313 R; 310/365

[58] Field of Search .............................. 73/649; 310/311, 310/313 R, 313 A, 313 B, 365

[56] References Cited

U.S. PATENT DOCUMENTS 4,469,978 9/1984 Hamada et al. ........................ 310/366

4,555,953 12/1985 Dario et al. .......................... 73/862.04

4,755,708 7/1988 Granz et al. ............................ 310/337

4,914,565 4/1990 Schnoeller et al. ..................... 367/164

FOREIGN PATENT DOCUMENTS 1170300 5/1989 Japan .

WO 91/08706 6/1991 United Kingdom .

*Primary Examiner*—Hezron Williams

*Assistant Examiner*—Thuy Vinh Tran

*Attorney, Agent, or Firm*—Harness, Dickey & Pierce, P.L.C.

[57] ABSTRACT

An ultrasound detector comprises an array of electrically isolated electrodes (2) embedded in a non-conducting matrix (4) of acoustically engineered material to form a composite body (5). A piezoelectric film (8) is bonded to the body (5) by an insulating adhesive (12), providing an ohmic/capacitive coupling between the electrodes (2) and respective areas of the film (8). The signal generated between the individual electrodes (2) and an electrode layer (18) overlaying the film (8) is processed to provide information on the sound pressure distribution of an ultrasound wave. The use of a non-conductive connection between the film (8) and electrodes (2) greatly facilitates manufacture but provides good performance.

9 Claims, 3 Drawing Sheets

ELECTRICAL COUPLING FOR PIEZOELECTRIC ULTRASOUND DETECTOR

Figure 1:
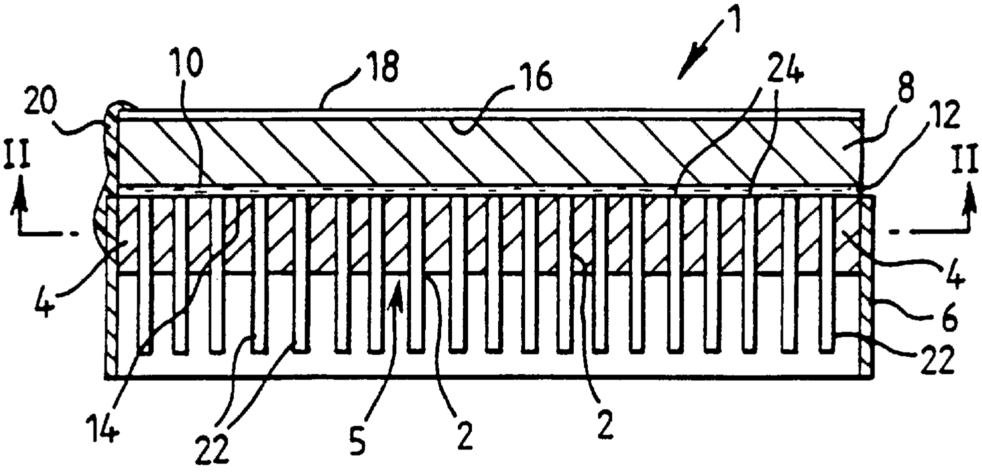

The present invention relates to an ultrasound detector, and in particular to an array type detector for detecting in the 150 kHz to 30 mHz range which is typically used in medical and high definition sonar applications.

It is known to have ultrasound detectors which comprise a two-dimensional array of discrete detector elements, which may number from 20 or so to several hundred. Aside from the complexity of handling the information output from the individual elements, the known detectors suffer from a very complex or intricate manufacturing process. Typically each element in an array has a discrete electrical coupling.

Some prior art devices utilise a sheet of piezoelectric material, such as polyvinylidenediflouride (PVDF), which has an array of discrete electrodes formed on one surface of the PVDF film, however this still requires sophisticated manufacturing techniques for forming the electrode pattern on the PVDF surface.

EP-A-506733 describes an invasive instrument using an ultrasound detector utilizing a PVDF film which is electrically coupled to an electrode by an ohmic or capacitive coupling.

We have now realized that this principle can be applied to the formation of an array of elements on an ultrasound detector.

The present invention provides an ultrasound detector comprising a layer of piezoelectric material having first and second major surfaces, and an array of electrodes adjacent and facing one of the major surfaces, the electrodes being electrically coupled to the material by an ohmic or capacitive coupling.

Preferably the other major surface has a conductive film extending across it to form an electrode pair with each of the electrodes of the array.

The array may be one-dimensional, but the invention is particularly suited to providing a two dimensional array. The preferred materials for forming the detector are PVDF,a homopolymer or co-polymer incorporating PVDF, or a piezo electric composite material.

The detector of the invention may be readily manufactured by embedding an array of wire or conductive polymer electrodes in an electrically insulating material. The piezoelectric film is then bonded to the surface of the electrode/insulating material matrix. The piezoelectric film may also be deposited on the matrix, or, particularly in the case of a piezo composite material, it may be injection moulded onto the matrix surface.

It is desirable to reduce reflection losses at the piezoelectric layer surfaces, and also the effect of acoustic reverberations within the body of the detector.

A matching layer may be provided in front of the piezoelectric material layer to minimize acoustic mismatch between the propagation medium in front of the detector and piezoelectric layer. A layer of anechoic material may be provided to dissipate or absorb the ultrasound which is transmitted through the piezoelectric layer, to prevent reflection back towards the piezoelectric layer.

Very preferably an anechoic material with a high acoustic fractional power dissipation is used. The conductive polymer electrodes, if used, may also be made of a polymeric material with acoustically engineered properties. Silicone, polyurethane and polybutadiene based polymers can be used to provide anechoic and acoustically engineered materials.

The insulating material with the electrodes embedded in it may be machined or moulded to provide a surface in which the ends of the electrodes are exposed.

Another aspect of the invention provides an ultrasound detector comprising a layer of piezoelectric material having first and second major surfaces, and an array of electrodes adjacent and facing one of the major surfaces, wherein the electrodes are formed of conductive polymer material.

The conductive polymer electrodes may be in direct electrical contact with the piezoelectric layer or separated from it by an ohmic or capacitive coupling. The piezoelectric layer should be in intimate contact with the electrode array and its surrounding matrix. This could be achieved by depositing the piezoelectric material layer onto the electrode/matrix composite body by a coating process.

An electronic module is connected to the array of electrodes for processing the signals generated by the piezoelectric film.

Very preferably the detector (that is the piezoelectric layer with the backing material(s) and electrodes) is readily detachable from the electronic module. In this way, detector arrays of different types may be substituted, and damaged arrays replaced. For example, measurement of the high intensity field of an ultrasound source used in medical lithotripters is likely to damage the detector.

The invention provides a device which can be manufactured economically to meet the needs of a two-dimensional array detector for rapid measurement of the sound pressure distribution in both amplitude and phase (or some other waveform feature) of an ultrasound field and also for assessing the ultrasound field generated by a scanner, both of which are particularly important in medical applications. This is of use not only for diagnostic purposes but also in assessing therapeutic fields such as the acoustic fields emitted by lithotripters to fragment kidney stones.

Additionally, knowledge of the instantaneous pressure amplitude and phase in a two-dimensional plane within an ultrasonic field facilitates the computation of field distribution elsewhere in space by forward or backward projection techniques. By this means, the original ultrasound source vibration distribution pattern or that of the resultant wavefronts anywhere in space may be deduced. Such a two-dimensional array could also meet the need of an artificial "retina" in acoustic camera applications, although in practice it is more likely that signal processing will be based on some feature of the acoustic waveform such as peak pressure or Doppler-shift An important additional medical application of such an array would be its use as a receiver in transmission ultrasonography in applications involving structural determinations such as osteoporosis screening, and in breast cancer screening where the detection of small calcifications in human breast tissue is required. To avoid the need for a dense array, the receiver (or transmitter) could be mechanically maneuvered to fill-in missing data points, or electrically phased to achieve this.

Figure 2:
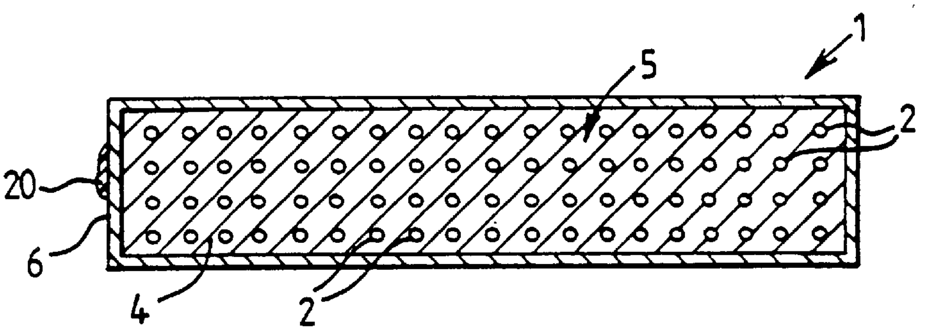
Figure 3:
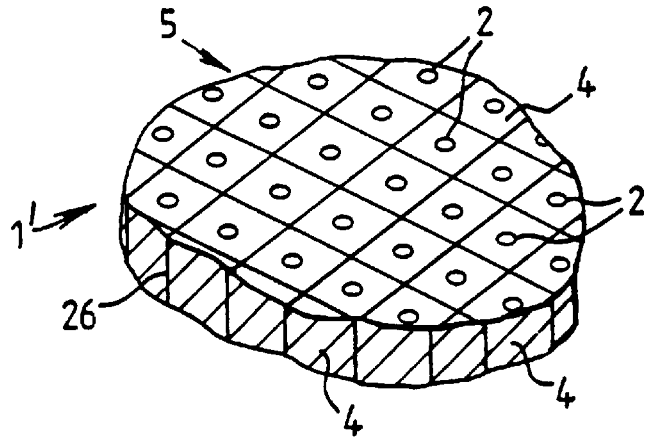
Figure 4:
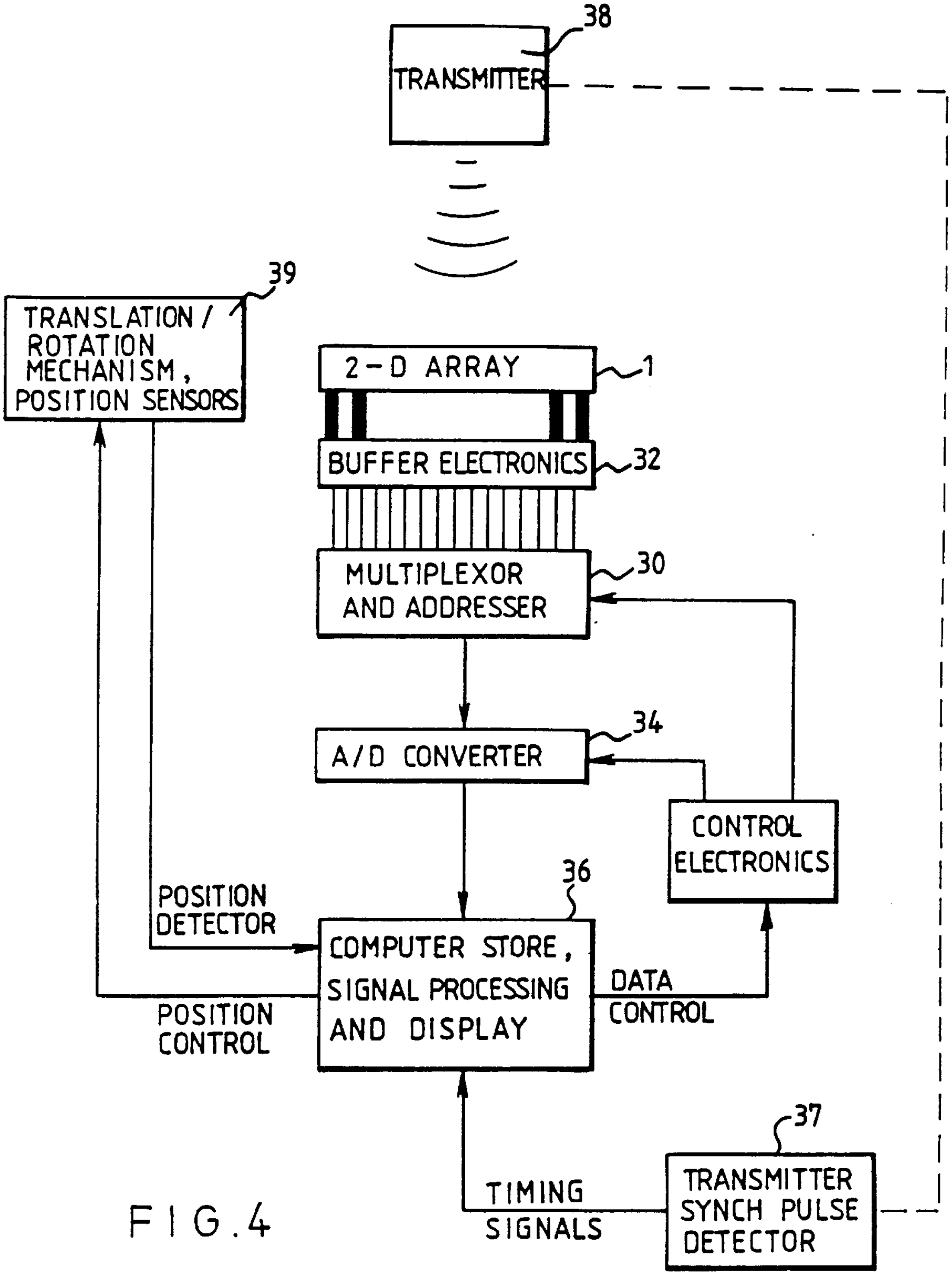
Figure 5:
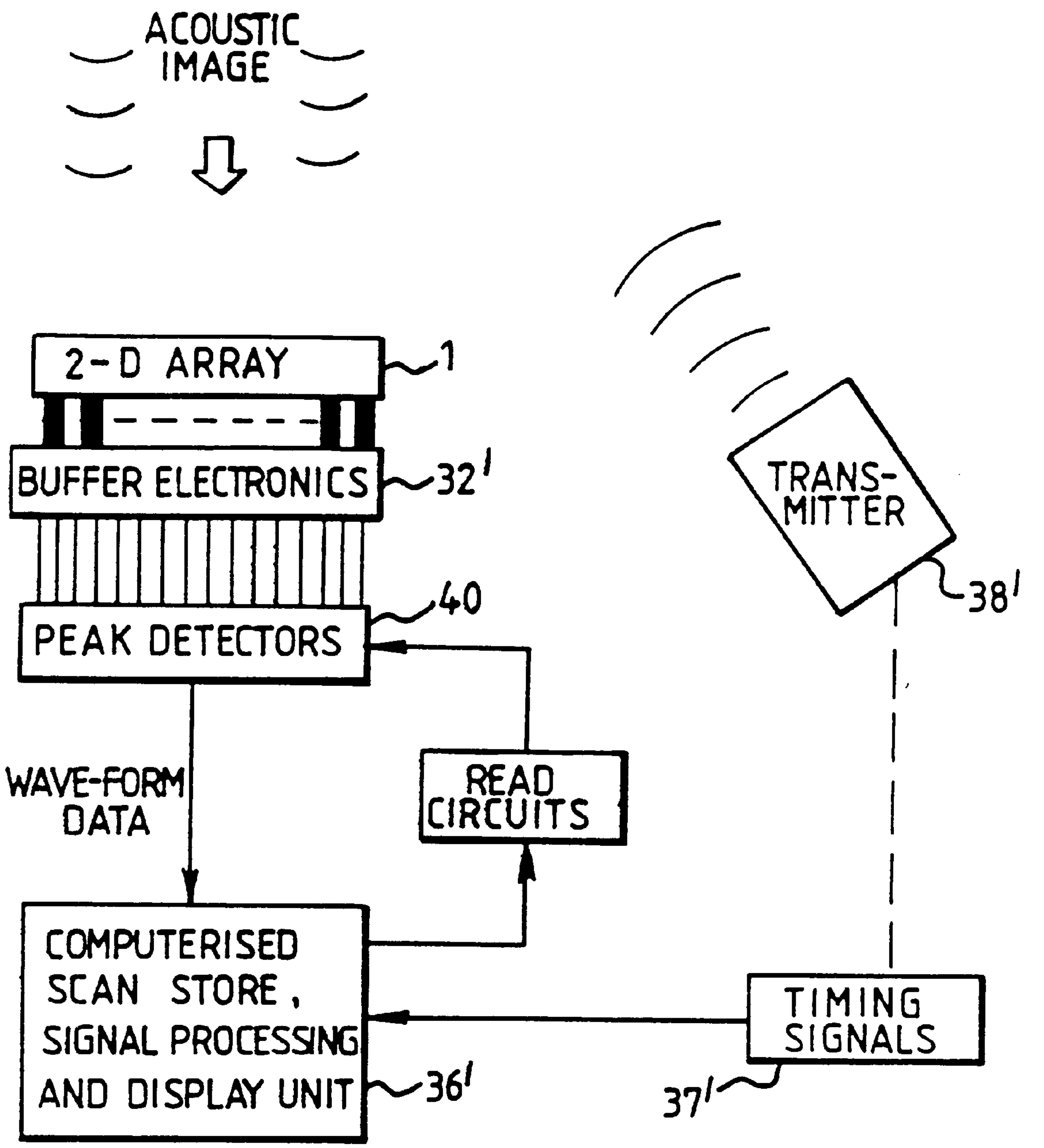

The invention will be further described by way of example, with reference to the accompanying drawings, in which:

FIG. 1 is a cross-section through an ultrasound detector forming an embodiment of the invention, FIG. 2 is a cross-section along the line II—II of FIG. 1, FIG. 3 illustrates a modification of the embodiment of FIG. 1, FIG. 4 is a schematic diagram illustrating a method of processing signals from the detectors of FIGS. 1 and 3 in a field measurement system, and FIG. 5 illustrates a method of processing signals in a real-time imaging system.

The drawings show by way of schematic illustration an embodiment of a detector in accordance with the invention.

Referring to the drawings, a detector 1 comprises two-dimensional array of pin-like electrodes 2 embedded in an insulating matrix 4 to form a composite body 5 which is surrounded by an outer electrode casing 6 which provides a ground connection. The material of the matrix surrounding the electrodes is preferably polyurethane or polybutadiene based but a variety of materials may be used if they meet the requirements of providing suitable electrical isolation between the pins and have suitable acoustic properties, for example some epoxy resins or silicone rubbers A continuous PVDF film 8 has one of its major surfaces 10 bonded to an upper surface 14 of the body 5 by an electrically non-conducting adhesive 12. The opposite major surface 16 of the PVDF film 8 is coated with a gold electrode film 18 which is electrically connected to the casing 6 by a conducting silver loaded paint or epoxy resin 20.

One end 22 of the electrode pins 2 project from the body 5 to enable connection to associated electronics (not shown) which monitor the signal generated between each pin 2 and the gold electrode film 18 as the PVDF film 8 is stressed by ultrasound.

The projecting ends 22 of the pins 2 are surrounded by the casing 6. A connector (not shown) may be provided to mate with the pin ends 22, or wires or other connections may be attached directly to the pin ends 22. Alternatively, the pin ends may be polished flat in the matrix to provide an array of pads for touch or pressure connection. An integrated package of electronic buffers and multiplexers, etc. may be coupled directly to the pins by mounting them on the body 5 (the electrodes 2 being flush with the major surfaces of the body 5 at both ends of the electrodes), or via a matting having uniaxial conductors distributed throughout—as commonly used in liquid crystal display technology, or one of similar such proprietary connection containing a regular array of through connectors, e.g. ISOCON (trade mark) connector mats produced by Circuit Components Inc. of Arizona, USA.

Surprisingly, it has been found that the end surface 24 of the pins 2 are coupled electrically (via the ohmic/capacitive coupling of the adhesive layer 12) only to the area immediately in front of them, and fringing effects from the surrounding area are not significant. Thus, the effect is a response which is similar to that expected from using an array of discrete PVDF elements.

The use of piezoelectric material such as PVDF or a piezo composite and an appropriate infilling material 4 such as an electrically insulating polymer between the electrodes 2 provides good electrical and acoustic insulation between the regions coupled to the respective electrodes 2. It is felt that a pure ceramic piezoelectric material, for example, may result in greater coupling between regions and hence performance would be degraded and more sophisticated signal processing would be required at the very least.

The device may be manufactured by embedding an array of electrodes 2 in the matrix 4, within the casing 6. The composite body 5 then machined flat on one surface for adhering the PVDF film 8. The PVDF film is typically supplied with an electrode coating on each major surface, and in this case one of these is stripped off for bonding to the body 5. PVDF film supplied with an electrode coating only on one (the outer) side may be used, or uncoated film may be used and an electrode film deposited after fabrication of the device. Silver paint 20 then connects the outer electrode coating 18 to the casing 6.

Typically PVDF film is available in a thickness of 9 to 110 microns, and a thickness of about 28 microns has been found suitable. The electrode cross-section will depend on the application, including the array size and sensitivity, but an electrode diameter of 0.1 to 2 mm and in particular 0.5 mm is suitable. The electrodes may be spaced apart by less than the electrode diameter. The array size and shape is also variable. Circular, square and rectangular arrays of, for example, 1024 or 8192 elements could be used.

The polymer matrix 4 may be used to bond directly to the PVDF film 8, the electrodes 2 being spaced from the film 8 by a thin layer of the polymer.

By using a flexible piezoelectric film, such as PVDF, the detector may present a curved surface, the pins 2 and insulating polymer body 4 being moulded or machined to form the curved surface to which the PVDF film is attached.

PVDF co-polymer coating may be deposited in situ, i.e. onto the upper surface of the body 5, a conductive coating 18 then being deposited on the PVDF co-polymer layer.

PVDF is usually supplied pre-polled (it is heated to above its Curie point and exposed to an intense electric field to render it piezoelectric). If an unpolled film is used (or deposited, in situ), then it may be polled by heating (for example in an oil bath) and applying the required electric potential between the electrodes 2 and the outer electrode coating 18. Polling in situ may have the advantage that the PVDF film is activated only in the regions immediately opposite the electrode 2, giving improved inter-element isolation.

As indicated, the electrodes 2 may be wire electrodes or strips of conductive polymer, such as carbon impregnated silicone rubber as used in electrically coupling liquid crystal displays to printed circuit boards. In an optimised form, the acoustic properties of the insulating matrix 4 and the conductive polymer electrodes 2 may be matched to the acoustic properties of the medium that the detector is in contact with (usually water or a water-like material such as human soft tissue). Also, the insulating matrix can be tailored to have a high acoustic fractional power dissipation In this way the face of the array can be made as acoustically invisible as possible and/or cross-coupling between elements minimized.

A two dimensional array of conductive polymer strips in a non-conducting matrix may be used as the body 5 to connect to the PVDF film, or to couple to the underside of the body 5.

In another embodiment, the electrodes 2 are electrically shielded from each other by a thin metal honeycomb 26 of electrically conductive material, for example metal, which is connected to ground. An air gap may also be provided to provide acoustic isolation. This will provide additional electrical and acoustic isolation between the electrodes 2 and is illustrated in FIG. 3.

It is envisaged that various other techniques might be used for reading the charge or signal on the detector electrodes. For example, the detector might be mounted on the outer surface of a cathode ray tube with the electrode pins touching the outer surface of the tube or extending through the tube wall. The electrical charge on the pins could be read by scanning the pin ends with an electron beam. The charge distribution on the pin ends may also be read by an array of detectors using solid-state techniques, such as a field emission display device or charge coupled device.

Referring to FIG. 4, this shows a schematic circuit diagram for reading and analyzing the signal produced by the detector 1. This system is particularly suited for a field measurement system, in which the ultrasound field distribution of a source 38 is to be determined.

The signal generated in the individual electrodes 2 of the detector 1 is read by a multiplexor/addressor circuit 30 coupled to the electrodes 2 by buffer electronics 32. The analogue signals are digitized by an analogue to digital converter 34 and fed to a central processor 36.

Central processor 36 receives a timing or synchronism signal from a timing signal detector 37 linked to the ultrasound transmitter 38, to initiate scanning of the electrodes 2 after a suitable time lapse from the ultrasound generation at the transmitter 38. The timing signal may be supplied direct by the ultrasound transmitter, or it may be detected remotely. In the arrangement shown, the location of the detector 1 relative to the source 38 may be varied by a control 39 to measure the field more extensively in two dimensions and/or in three dimensions.

"Real-time" addressing is not required and so the electrodes 2 may be addressed in turn by the multiplexor/addressor 30 at a relatively slow rate as the transmitter 38 is operated so that the signal waveform at each electrode is detected in sequential field transmissions.

For real-time addressing, such as in an imaging system, the electronic circuitry for detecting the full signal waveform at each electrodes may be impractical. In FIG. 5, an array of peak detectors 40 captures the peak signal generated in each electrode, and the outputs of the peak detectors 40 are processed by the central processor 36'. The peak detectors 40 may be refreshed at pre-determined intervals in synchronism with the transmitter pulses and at a suitable frame rate, such as 25 or 50 Hz for visual imaging. This system could also be used for field measurement.

I claim:

1. An ultrasound detector, comprising:

a plurality of elongate electrodes each comprising an electrical conductor having an axial end;

the plurality of elongate electrodes being embedded in a body of electrically insulating matrix material with the axial ends of the elongate electrodes being arranged in an array at one surface of the body of matrix material;

a layer of piezoelectric material having first and second major surfaces, the first major surface facing the one surface of the body of matrix material and being electrically coupled to the plurality of elongate electrodes by an ohmic or capacitive coupling; and an electrode film on the second major surface and positioned opposite the array of elongate electrodes.

2. A detector as claimed in claim 1, wherein the layer of piezoelectric material is substantially planar.

3. A detector as claimed in claim 1, in which the elongate electrodes are bonded to the layer of piezoelectric material by a non-conductive adhesive.

4. A detector as claimed in claim 1 in which the layer of piezoelectric material is flexible.

5. A detector as claimed in claim 1 wherein the elongate electrodes are separated from each other by an electrical ground.

6. A detector as claimed in claim 1, in which the elongate electrodes are formed of conductive polymer material.

7. A method of measuring an ultrasound field, the method comprising providing a detector as defined in claim 1 and reading and analyzing electronically signals produced in the electrodes when the detector is exposed to the ultrasound field.

8. A detector as claimed in claim 1, wherein the array of elongate electrodes is a two-dimensional array.

9. A detector as claimed in claim 8, wherein the piezoelectric material is polled throughout its major surface area.

* * * * *